United States Patent
Tsuji et al.

(10) Patent No.: US 10,914,343 B2
(45) Date of Patent: Feb. 9, 2021

(54) BALL BEARING

(71) Applicant: NTN CORPORATION, Osaka (JP)

(72) Inventors: Naoaki Tsuji, Mie (JP); Hikaru Ishida, Mie (JP); Chiharu Ito, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 16/342,814

(22) PCT Filed: Oct. 19, 2017

(86) PCT No.: PCT/JP2017/037872
§ 371 (c)(1),
(2) Date: Apr. 17, 2019

(87) PCT Pub. No.: WO2018/074555
PCT Pub. Date: Apr. 26, 2018

(65) Prior Publication Data
US 2020/0056661 A1  Feb. 20, 2020

(30) Foreign Application Priority Data
Oct. 21, 2016  (JP) .................... 2016-206986

(51) Int. Cl.
*F16C 33/66*  (2006.01)
*F16C 19/06*  (2006.01)

(52) U.S. Cl.
CPC .......... *F16C 33/6681* (2013.01); *F16C 19/06* (2013.01)

(58) Field of Classification Search
CPC .............. F16C 33/3875; F16C 33/3887; F16C 33/6633; C10N 2240/02
See application file for complete search history.

(56) References Cited

U.S. PATENT DOCUMENTS

| | | | | |
|---|---|---|---|---|
| 5,487,939 A | * | 1/1996 | Phillips | B32B 17/10036 428/334 |
| 7,135,441 B2 | * | 11/2006 | Sugimori | C10M 117/04 508/485 |
| 9,139,793 B2 | * | 9/2015 | Kawamura | C10M 135/18 |
| 9,765,821 B2 | * | 9/2017 | Kawamura | C10M 169/04 |

(Continued)

FOREIGN PATENT DOCUMENTS

| | | |
|---|---|---|
| CN | 102171469 | 8/2011 |
| CN | 104956105 | 9/2015 |

(Continued)

OTHER PUBLICATIONS

International Search Report dated Dec. 19, 2017 in International (PCT) Application No. PCT/JP2017/037872.

(Continued)

*Primary Examiner* — Phillip A Johnson
(74) *Attorney, Agent, or Firm* — Wenderoth, Lind & Ponack, L.L.P.

(57) ABSTRACT

A ball bearing is provided which includes inner and outer races each having a raceway groove; balls; and a retainer made of a synthetic resin, and in which abnormal noise is reduced. Either the raceway groove of the inner race, or each of the raceway grooves of the inner race and the outer race has a radius of curvature which is 104% or more and 109% or less of the radius of each of the balls.

2 Claims, 7 Drawing Sheets

(56) References Cited

U.S. PATENT DOCUMENTS

| | | | |
|---|---|---|---|
| 2003/0077015 A1* | 4/2003 | Sugimori | F16C 33/427 |
| | | | 384/513 |
| 2007/0230849 A1* | 10/2007 | Naito | F16C 33/3887 |
| | | | 384/530 |
| 2011/0021392 A1* | 1/2011 | Wheatley | C10M 133/40 |
| | | | 508/261 |
| 2013/0182986 A1 | 7/2013 | Tanaka et al. | |
| 2015/0307805 A1* | 10/2015 | Kanda | C10M 169/02 |
| | | | 384/462 |
| 2015/0369291 A1 | 12/2015 | Kario et al. | |

FOREIGN PATENT DOCUMENTS

| | | |
|---|---|---|
| JP | 2000-120700 | 4/2000 |
| JP | 2003-227515 | 8/2003 |
| JP | 2003-343571 | 12/2003 |
| JP | 2011-085153 | 4/2011 |
| JP | 2012-220015 | 11/2012 |
| JP | 2016-109173 | 6/2016 |
| JP | 2016-133143 | 7/2016 |
| JP | 2016-133214 | 7/2016 |

OTHER PUBLICATIONS

International Preliminary Report on Patentability of the International Searching Authority dated Apr. 23, 2019 in International (PCT) Application No. PCT/JP2017/037872, with English translation.

* cited by examiner

BALL BEARING

TECHNICAL FIELD

The present invention relates to a ball bearing including a retainer made of a synthetic resin.

BACKGROUND ART

Generally, ball bearings include an inner race; an outer race; a plurality of balls disposed between the inner race and the outer race so as to be circumferentially spaced apart from each other; and a retainer retaining the balls. Many older ball bearings for a motor used a retainer made of a metal and thus having high rigidity, but in recent years, an increasing number of such ball bearings use a synthetic resin retainer, because a synthetic resin retainer is lighter in weight and quieter than metal retainers.

As such a synthetic resin retainer, for example, a retainer is disclosed in Japanese Unexamined Patent Application Publication No. 2003-343571 and Japanese Unexamined Patent Application Publication No. 2016-1091732, the retainer comprising a pair of annular members made of a synthetic resin, and engaged with each other so as to be axially opposed to each other. In the retainer of Japanese Unexamined Patent Application Publication No. 2016-109173, a plurality of circumferentially spaced apart pockets are defined by the opposed surfaces of the annular members such that the balls of the bearing are received in the respective pockets. Each pocket has, on the axial side thereof, cylindrical surfaces extending along the outer periphery of the ball, and each formed such that the axial direction of the cylindrical surface corresponds to the radial direction of the retainer. Also, each pocket has, at both circumferential ends thereof, concave spherical surfaces extending along the outer periphery of the ball.

When an excessive radial load is applied to the synthetic resin retainer, a load receiving area in which radial and moment loads are applied, and a non-load-receiving area in which no loads are applied are generated over the entire circumference of the bearing. In this case, while the bearing is operating, the contact angle between each ball and the raceway surface of the bearing changes significantly when the ball enters and exits the load receiving area. As a result thereof, the revolution speed of the ball around the center axis of the bearing changes significantly at the entrance and exit of the load receiving area, thereby changing the force applied to the retainer.

Figure 7A:
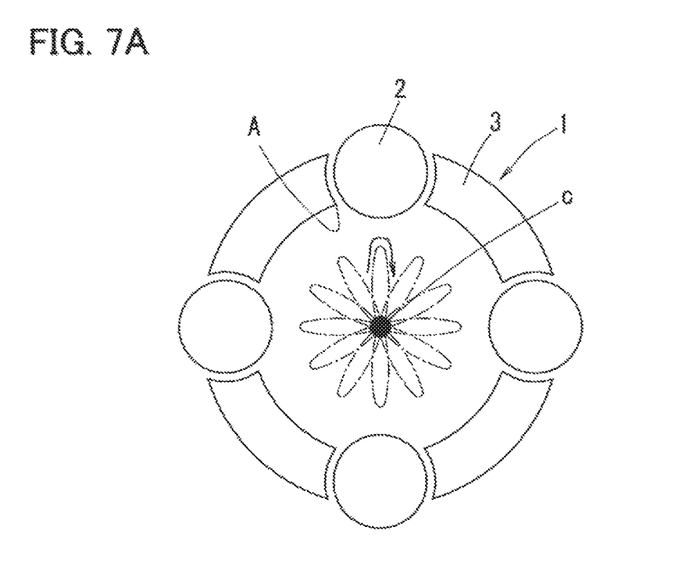
FIG. 7A is a conceptual diagram illustrating how the rotation center of the retainer of the ball bearing moves, when the retainer is normally rotating.
Figure 7B:
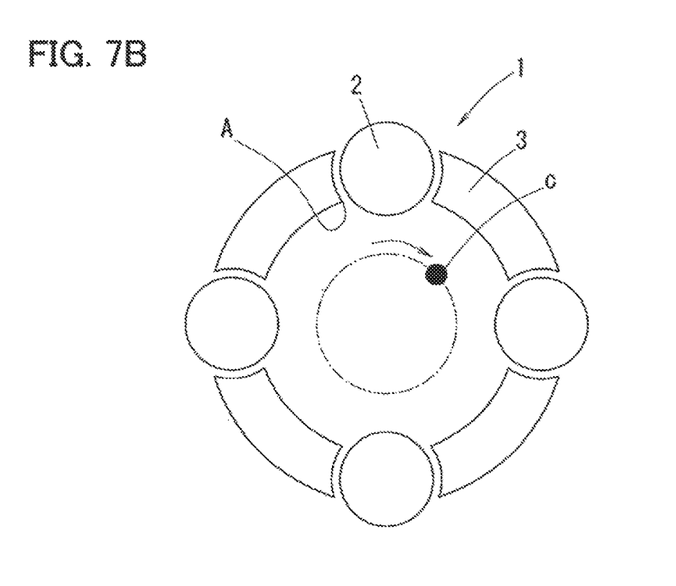
FIG. 7B is a conceptual diagram illustrating how the rotation center of the retainer of the ball bearing moves, when the retainer is rotating while displaced.

Due to the change in revolution speed of each ball as described above, grease is dragged into the space between the ball and the corresponding pockets of the retainer (this space is shown in FIGS. 7A and 7B by reference numeral "A" and referred as the "vibration occurrence portion"). As a result, the retainer is strongly pushed toward the ball in one direction due to the drag resistance of the grease, thereby causing the run-out of the retainer. This may vibrate the retainer and generate abnormal noise. Namely, while no abnormal noise is occurring, as illustrated in the radial sectional schematic diagram of FIG. 7A, the center c of the retainer 3 vibrates vertically and horizontally with respect to the designed center without being displaced therefrom. However, if the retainer 3 is pushed toward the ball 2 at the vibration occurrence portion A, as illustrated in the radial sectional schematic diagram of FIG. 7B, the center c of the retainer 3 rotates while displaced from the designed center, thereby generating abnormal noise.

Since the revolution speed of the balls changes significantly at the entrance and the exit of the load receiving area, it is difficult to reduce this change with the synthetic resin retainer so as to reduce abnormal noise. While metal retainers are less likely to deform compared to synthetic resin retainers, and thus no abnormal noise occurs, metal retainers are heavier than synthetic resin retainers, and thus cannot rotate at a high speed as with synthetic resin retainers. Also, as another problem, under sever use conditions, peculiar peeling/flaking accompanied by white tissue change may occur in the raceway grooves at an early stage.

It is an object of the present invention to provide a ball bearing which includes a retainer made of a synthetic resin, and in which abnormal noise is reduced when an excessive radial load is applied to the ball bearing.

SUMMARY OF THE INVENTION

The present invention provides a ball bearing including inner and outer races each having a raceway groove; balls; and a retainer made of a synthetic resin, and characterized in that either the raceway groove of the inner race, or each of the raceway grooves of the inner race and the outer race has a radius of curvature which is 104% or more and 109% or less of a radius of each of the balls.

If the above radius of curvature is within this range, the revolution speed of the balls around the center axis of the bearing changes little when the balls enter and exit the load receiving area of the bearing. This reduces the amount of grease dragged into the spaces between the pockets of the synthetic resin retainer and the balls. As a result thereof, it is possible to prevent the run-out of the synthetic resin retainer, namely, avoid the phenomenon that the retainer is strongly pushed toward the balls in one direction, and thus rotates while displaced from the designed center axis. By preventing such run-out, it is possible to reduce abnormal noise in the ball bearing.

The radii of curvature of the raceway grooves of the inner and outer races with respect the radius of each ball may be equal to each other. Especially if the above radii of curvature are both 108% of the radius of each ball, it is possible to more effectively reduce abnormal noise in the ball bearing.

By using, as grease for the ball bearing, improved grease as described below for preventing brittle separation, it is possible to prevent peeling or flaking in the ball bearing. Such improved grease comprises a base oil; a thickening agent; and an additive selected from the group consisting of alkanolamines and molybdates. The base oil comprises a poly-α-olefin oil having a kinematic viscosity of 30 to 70 $mm^2/s$ at 40 degrees Celsius. The thickening agent comprises a diurea compound obtained by reacting a diisocyanate component with a monoamine component. The monoamine component comprises an aliphatic monoamine and an alicyclic monoamine. A content of the additive is 0.1 parts by mass or more and 10 parts by mass or less with respect to 100 parts by mass of a total amount of the base oil and the thickening agent.

Effects of the Invention

By using a ball bearing and grease as described above, the ball bearing including a synthetic resin retainer, it is possible to reduce abnormal noise when the an excessive radial load is applied to the ball bearing.

DETAILED DESCRIPTION OF THE INVENTION

Figure 1:
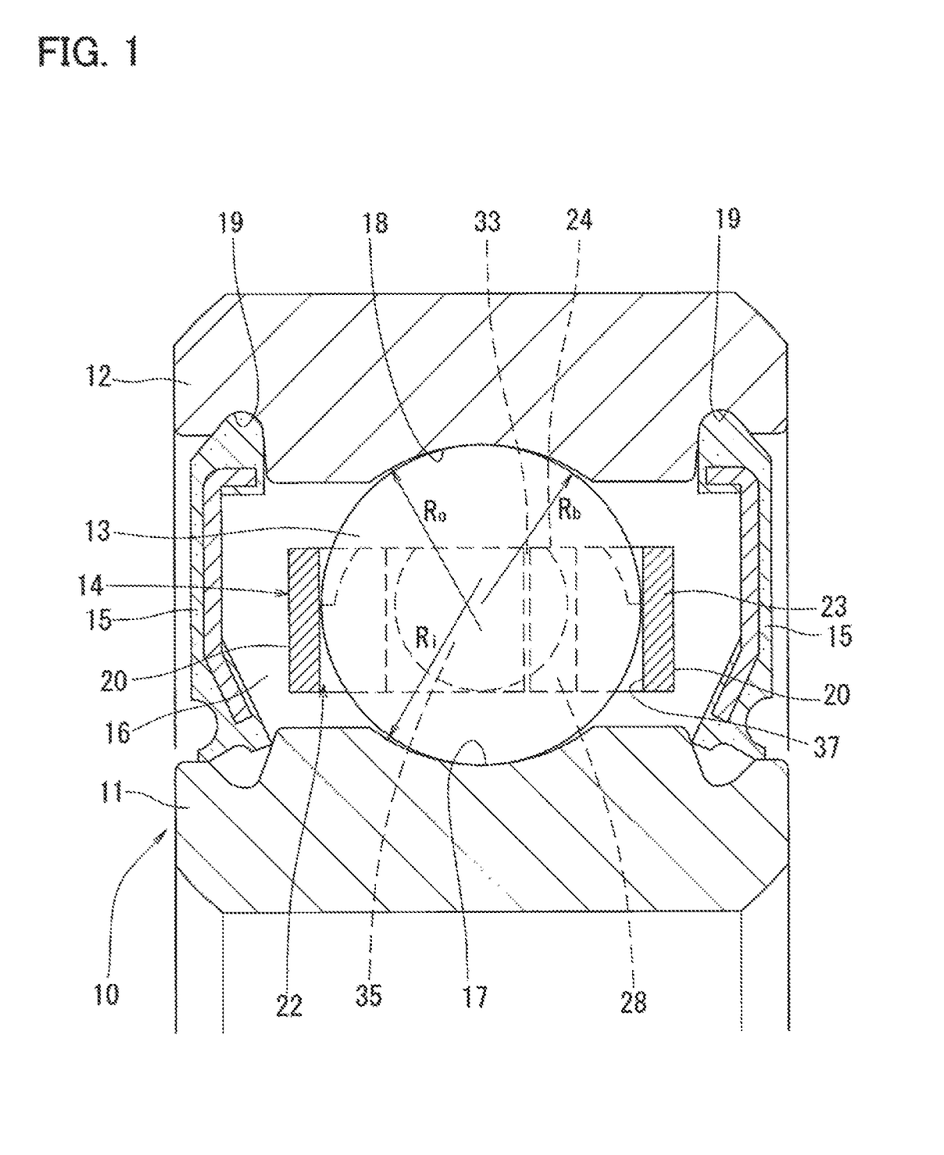
FIG. 1 is a sectional view of a ball bearing embodying the present invention.

A ball bearing 10 according to the present invention is now described. As illustrated in FIG. 1, the ball bearing 10 includes an inner race 11; an outer race 12; a plurality of balls 13 disposed between the inner race 11 and the outer race 12; and a synthetic resin retainer 14 made of a synthetic resin, and retaining the balls 13.

The inner race 11 includes, in its outer periphery, a circumferentially extending raceway groove 17 having a circular arc-shaped cross section. The outer race 12 includes, in its inner periphery, a circumferentially extending raceway groove 18 having a circular arc-shaped cross section. The balls 13 are in rolling contact with both the raceway groove 17 of the inner race 11 and the raceway groove 18 of the outer race 12.

The radius of curvature $R_i$ of the raceway groove 17 in the outer periphery of the inner race 11, and the radius of curvature $R_o$ of the raceway groove 18 in the inner periphery of the outer race 12 are each 104% or more and 109% or less of the radius $R_b$ of each ball 13. By setting the radii of curvature $R_i$ and $R_o$ within this range, the contact angles between each ball and the respective raceway surfaces of the inner and outer races change little when the balls enter and exit the load receiving area of the bearing. As a result thereof, the revolution speed of the balls around the center axis of the bearing changes little when the balls enter and exit the load receiving area. This reduces the amount of grease dragged into the spaces between the retainer and the balls, thereby reducing abnormal noise produced due to grease being dragged into the spaces between the retainer and the balls. Preferably, the radii of curvature $R_i$ and $R_o$ of the inner and outer races are each 107% or more and 109% or less of the radius $R_b$ of each ball. The radii of curvature $R_i$ and $R_o$ may be equal to each other.

The synthetic resin retainer 14 comprises a pair of (i.e., two) annular members 20 each having a wavy shape in plan view. Each annular member 20 has surfaces opposed to the surfaces of the other annular member 20, and the respective opposed surfaces define pockets 22 extending along the outer peripheries of the balls 13, and circumferentially equidistantly spaced apart from each other.

The annular members 20 are formed by injection molding of a synthetic resin. The two annular members 20 are identical in shape to each other, and thus can be formed in the same mold. As the synthetic resin forming the annular members 20, for example, a polyamide (such as PA46) may be used. Instead of a polyamide, polyphenylene sulfide (PPS), polyether ether ketone (PEEK), etc. may be used. In order to increase the strength of the annular members 20, 20-30% by mass of glass fiber may be added to the synthetic resin forming the annular members 20. Instead of or in addition to glass fiber, carbon fiber, aramid fiber, etc. may be added thereto.

Figure 2:
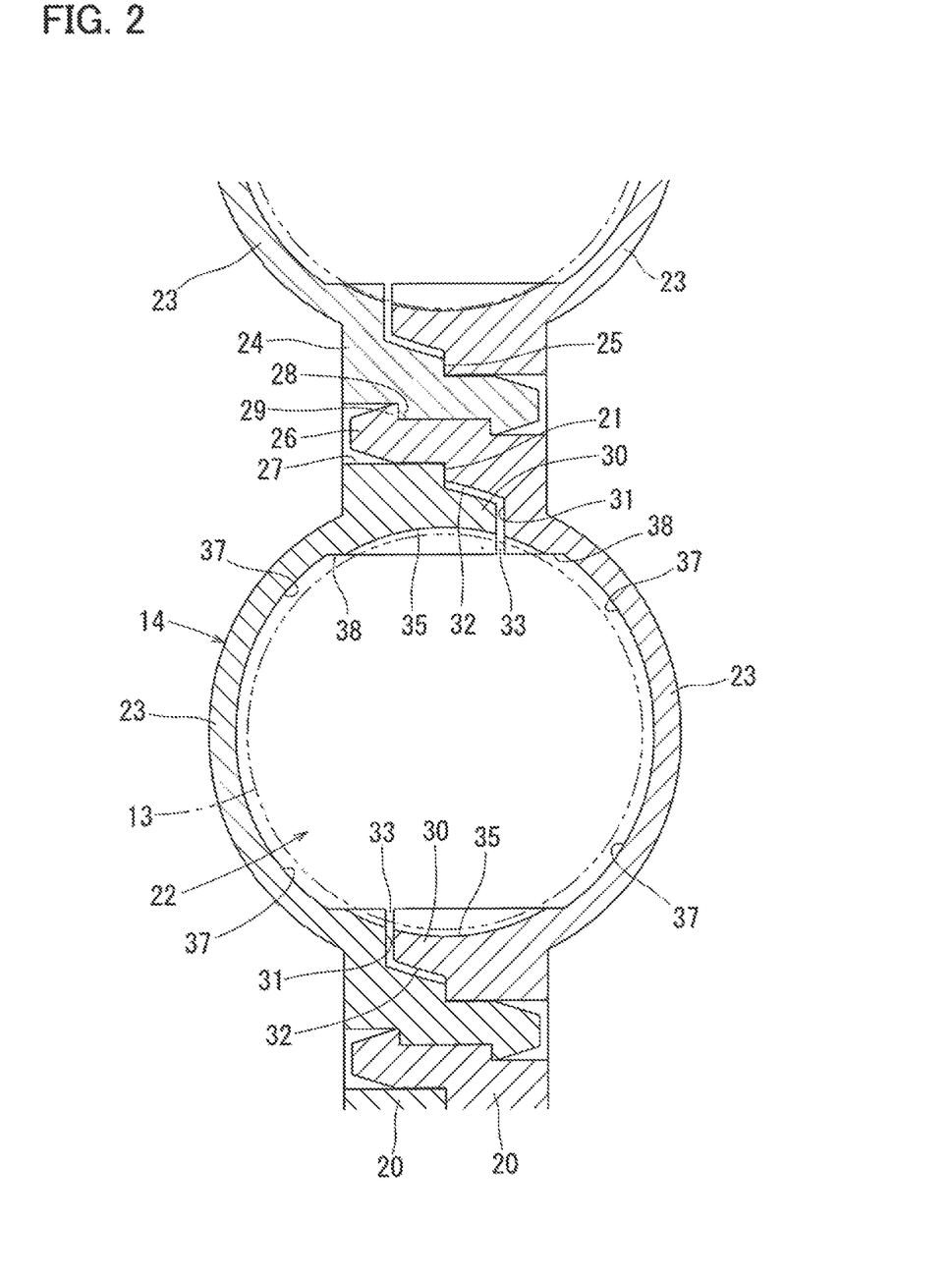
FIG. 2 is an enlarged circumferential sectional view of a pocket(s) of the retainer of FIG. 1.
Figure 3:
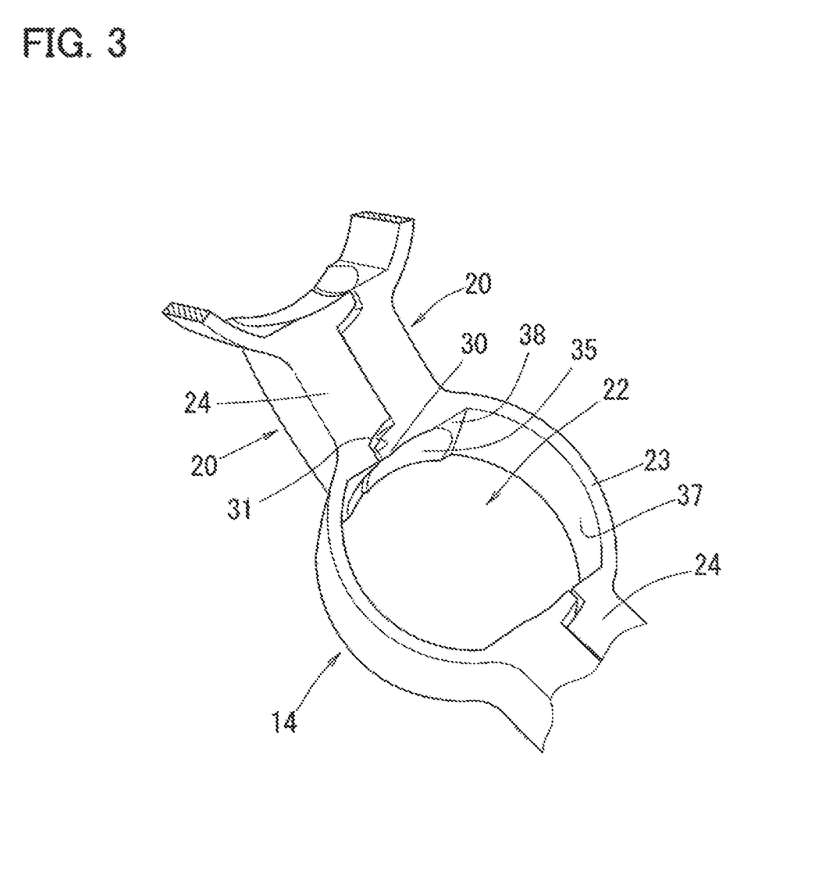
FIG. 3 is an enlarged perspective view of a pocket(s) of the retainer made of a synthetic resin, which relates to the problem of the present invention.

As illustrated in the radial sectional view of FIG. 2, and the perspective view of FIG. 3, each annular member 20 includes arc-shaped pocket wall portions 23 each comprising an axially recessed and curved portion defining a part of the inner surface of one of the pockets 22. Each circumferentially adjacent pair of pocket wall portions 23 are coupled together through a coupling plate portion 24 comprising a flat plate such that the pocket wall portions 23 are equidistantly spaced apart from each other in the circumferential direction of the annular member 20.

The coupling plate portions 24 of each annular member 20 have abutment surfaces 25, respectively, configured to be brought into surface contact with the respective abutment surfaces 25 of the other annular member 20 when the two annular members 20 are coupled together. Each annular member 20 includes, at the center of each abutment surface 25, an axially protruding coupled claw 26 having a hook portion 29; and a coupling hole 27 having a step 28 on its inner surface, the coupling hole 27 being configured to receive the opposed coupled claw 26 of the other annular member 20 until the hook portion 29 of the coupled claw 26 engages the step 28 of the coupling hole 27. Therefore, when the two annular members 20 are axially moved toward each other until the coupled claws 26 of each annular member 20 are inserted into the respective coupling holes 27 of the other annular member 20, the hook portions 29 engage with the steps 28, thereby preventing the coupled claws 26 from being pulled out of the coupling holes 27, and coupling the two annular members 20 together.

Each coupling plate portion 24 of each annular member 20 includes an axially protruding wall portion 30 on one end of the abutment surface 25; and a receiving recess 31 in the other end of the abutment surface 25, the receiving recess 31 being configured to receive the opposed protruding wall portion 30 of the other annular member 20. By the provision of the protruding wall portions 30 and the receiving recesses 31, when the two annular members 20 are coupled together, it is possible to make the abutment lines of the annular members 20 offset from the axial centers of the pockets 22.

The protruding wall portion 30 and the receiving recess 31 of each coupling plate portion 24 of each annular member 20 are designed such that, with the two annular members 20 coupled together, a circumferential gap 32 and an axial gap 33 are defined between the protruding wall portion 30 and the corresponding receiving recess 31 of the other annular member 20, specifically, a circumferential gap 32 is defined between the inner surface of the receiving recess 31 and the side surface of the protruding wall portion 30 opposite from the side surface thereof facing the pocket 22, and an axial gap 33 is defined between the inner surface of the receiving recess 31 and the axial distal end of the protruding wall portion 30. Due to these gaps, even if the annular members 20 contract to a different degree after being formed by injection molding, it is possible to prevent the protruding wall portions 30 from interfering with the receiving recesses 31, and thus to reliably bring the abutment surfaces 25 of the coupling plate portions 24 of one of the annular members 20 into close contact with the abutment surfaces 25 of the coupling plate portions 24 of the other annular member 20.

As illustrated in FIG. 3, each pocket 22 has, at the respective circumferential ends thereof, concave spherical surfaces 35 extending along the outer periphery of the ball 13. Each concave spherical surface 35 is a partial concave spherical surface having an area orthogonal to the pitch circle of the balls 13. The concave spherical surfaces 35 of each pocket 22 are disposed on the leading and trailing ends of the pocket 22 in the movement/revolution direction of the ball 13 so as to be opposed to each other through the ball 13. The radius of curvature of each concave spherical surface 35 is slightly larger than the radius of the ball 13. The pitch circle of the balls 13 is an imaginary circle passing through the centers of all of the balls 13.

As illustrated in FIGS. 2 and 3, each pocket 22 has, on the respective axial ends thereof, cylindrical surfaces 37 extending along the outer periphery of the ball 13, and axially opposed to each other through the portion of the ball 13 located radially inwardly of the pitch circle of the balls 13. Each cylindrical surface 37 is a partial cylindrical surface having a center axis extending in the radial direction of the synthetic resin retainer 14 such that the cylindrical surface 37 extends along the outer periphery of the ball 13 in the radial direction of the synthetic resin retainer 14.

The radius of each cylindrical surface 37 is slightly larger than the radii of curvature of the concave spherical surfaces 35. Each concave spherical surface 35 is connected to the respective cylindrical surfaces 37 through flat surfaces 38 on the respective sides of the concave spherical surface 35 (see FIG. 3).

While, in the above embodiment, a synthetic resin retainer 14 is exemplified which comprises two annular members 20 coupled together by their coupled claws 26 and coupling holes 27, the present invention can be also applied to a ball bearing 10 including a synthetic resin retainer comprising two annular members 20 of which the opposed coupling plate portions 24 are coupled together. The present invention is especially suitable for a retainer of which the pockets each includes portions circumferentially receiving balls, and comprising concave spherical surfaces, for example, a retainer as disclosed in Japanese Unexamined Patent Application Publication No. 2003-343571.

As illustrated in the sectional view of FIG. 1, the ball bearing 10 of the present invention includes a pair of seal members 15 axially opposed to each other through the balls 13 and the synthetic resin retainer 14. The outer peripheries of the seal members 15 are fixed to seal grooves 19 formed in the respective groove shoulders of the raceway groove 18 of the outer race 12. The inner peripheries of the seal members 15 are in sliding contact with the outer periphery of the inner race 11. The seal members 15 prevent lubricating grease (not shown) sealed in the annular space 16 between the inner race 11 and the outer race 12 from leaking out of the ball bearing.

Greases capable of being used for the ball bearing 10 are now described. The grease for the ball bearing 10 comprises a base oil; a thickening agent; and an additive or additives comprising an alkanolamine and/or a molybdate. If an alkanolamine is used as an additive, even if the oil film between the rolling surfaces becomes thin under severe conditions (boundary lubrication conditions), the alkanolamine is adsorbed onto frictionally worn surfaces or iron-based metal fresh surfaces exposed due to wear, thereby preventing the grease from coming into direct contact with the frictionally worn surfaces or the iron-based metal fresh surfaces. If a molybdate is used as an additive, the molybdate decomposes and reacts with iron oxides on the iron-based metal fresh surfaces, thereby forming a molybdenum compound film thereon. These prevent or reduce the generation of hydrogen due to the decomposition of the grease, thereby preventing peculiar flaking or peeling due to hydrogen embrittlement. Also, by limiting the amounts of these additives within predetermined ranges, and appropriately selecting a base oil and a thickening agent (which forma base grease), it is possible to further reduce abnormal noise in the bearing if, for example, a retainer comprising two synthetic resin retainer members coupled together is used. This seems to be possible, e.g., due to the fact that, by doing so, grease can be prevented from being excessively dragged into the spaces between the concave spherical surfaces 35 of the pockets 22 of the synthetic resin retainer 14 and the outer peripheral surfaces of the balls 13.

Alkanolamines which can be used in the above grease include primary alkanolamines such as monoisopropanolamine, monoethanolamine and mono-n-propanolamine; secondary alkanolamines such as N-alkyl monoethanolamine and N-alkyl monopropanolamine; and tertiary alkanolamines such as triethanolamine, cyclohexyldiethanolamine, tri(n-propanol)amine, triisopropanolamine, N, N-dialkylethanolamine, and N-alkyl(or alkenyl)diethanolamine. According to the number of alkanol groups, alkanolamines are classified into monoalkanolamines, dialkanolamines, and trialkanolamines. In the present invention, it is preferable to use a dialkanolamine or a trialkanolamine, because iron ions are sandwiched due to the chelating action between a plurality of hydroxyl groups (alkanol groups) and amino groups of such an alkanolamine, thereby easily preventing the exposure of the iron-based metal fresh surfaces.

Among the above alkanolamines, it is preferable to use N-alkyl(or alkenyl)diethanolamine of the following Formula (1) because it is compatible with the base oi, can effectively prevent peeling or flaking, and it can be easily obtained.

[Formula 1]

(1)

$R_1$ in Formula 1 indicates a straight-chain or branched alkyl group or alkenyl group having 1 to 20 carbon atoms, preferably 1 to 12 carbon atoms, more preferably 1 to 8 carbon atoms. Specifically, such compounds include, for example, N-methyldiethanolamine, N-ethyldiethanolamine, N-propyldiethanolamine, N-butyldiethanolamine, N-pentyldiethanolamine, N-hexyldiethanolamine, N-heptyldiethanolamine, N-octyldiethanolamine, N-nonyldiethanolamine, N-decyldiethanolamine, N-undecyldiethanolamine, N-lauryldiethanolamine, N-tridecyldiethanolamine, N-myrietyldiethanolamine, N-pentadecyldiethanolamine, N-palmityldiethanolamine, N-heptadecyldiethanolamine, N-oleyldiethanolamine, N-stearyldiethanolamine, N-isostearyldiethanolamine, N-nonadecyldiethanolamine, or N-eicosyldiethanolamine.

One or two or more alkanolamines may be used in the grease. The alkanolamine(s) used therein is preferably in a liquid or pasty state at room temperature or use temperature, and may be dispersed in e.g., a solvent. Such an alkanolamine (or alkanolamines) is less likely to adversely affect the quietness of the bearing. Also, even if the oil film between the rolling surfaces becomes thin, the alkanolamine(s) can easily enter the spaces between the rolling surfaces. The kinematic viscosity of the alkanolamine(s) is preferably 10 to 100 mm$^2$/s at 40 degrees Celsius, more preferably 40 to 70 mm$^2$/s at 40 degrees Celsius.

Commercially available alkanolamines (tertiary diethanolamines) include, for example, ADEKA KIKU-LUBE FM-812 or ADEKA KIKU-LUBE FM-832, both made by ADEKA.

The molybdate used in the above grease preferably comprises a metal salt. The metal constituting the metal salt may be, for example, sodium, potassium, lithium, magnesium, calcium, copper, zinc, or barium. The metal salt is preferably an alkali metal salt because it can easily form the above-mentioned molybdenum compound film. Such alkali metal salts include, for example, lithium molybdate, sodium molybdate, and potassium molybdate. One or two or more molybdates may be used in the grease.

The above grease contains, with respect to 100 parts by mass of the total amount of the base oil and the thickening agent, 0.1 to 10 parts by mass of at least one additive selected from the group consisting of alkanolamines and molybdates. If both an alkanolamine (or alkanolamines) and a molybdate (or molybdates) are used in the grease, the total amount of the alkanolamine(s) and the molybdate(s) is within this range. In order to further reduce abnormal noise in the bearing, the amount of the molybdate(s), which is in a solid state, is preferably small compared with that of the alkanolamine(s), which is, for example, in a liquid state. For example, (i) if the at least one additive includes an alkanolamine (or alkanolamines), and not a molybdate, the amount of the alkanolamine (alkanolamines) is preferably 2 to 8 parts by mass with respect to 100 parts by mass of the total amount of the base oil and the thickening agent; whereas (ii) if the at least one additive includes a molybdate (or molybdates), and not an alkanolamine, the amount of the molybdate(s) is preferably 0.5 to 3 parts by mass with respect to 100 parts by mass of the total amount of the base oil and the thickening agent. By setting the amount of the at least one additive within the range defined by (i) or (ii), and using predetermined ones as the base oil and the thickening agent, it is possible to prevent abnormal noise, while preventing peeling or flaking. In case (i) above, the grease may contain an additive or additives other than the alkanolamine(s), and in case (ii), the grease may contain an additive or additives other than the molybdate(s).

The base oil of the above grease comprises a PAO, which is a synthetic hydrocarbon oil comprising a mixture of oligomers or polymers of at least one α-olefin or at least one isomerized α-olefin. Such α-olefins include, for example, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetradecosene. Normally, a mixture of these is used.

The kinematic viscosity of the above base oil at 40 degrees Celsius is 30 to 70 mm$^2$/s, more preferably 30 to 60 mm$^2$/s. If the kinematic viscosity thereof at 40 degrees Celsius is less than 30 mm$^2$/s, the viscosity of the base oil is too low, and an oil film tends to partially disappear. Also, more oil is likely to evaporate. On the other hand, if the kinematic viscosity thereof at 40 degrees Celsius is more than 70 mm$^1$/s, abnormal noise and/or rotation torque may increase. If mixed oil is used which comprises different PAO's having different kinematic viscosities, the kinematic viscosity of the mixed oil is set within the above range.

The thickening agent of the above grease comprises an aliphatic and alicyclic diurea compound, which is one of urea compounds. A urea compound is obtained by reacting a polyisocyanate component and a monoamine component with each other. An aliphatic and alicyclic diurea compound is obtained by using a diisocyanate as a polyisocyanate component, and using an aliphatic monoamine and an alicyclic monoamine as monoamine components. Preferably, the aliphatic and alicyclic diurea compound of the grease is prepared such that the aliphatic monoamine constitutes the main component of the monoamine components, more specifically, the content of the aliphatic monoamine is larger than that of the alicyclic monoamine. This is because such a grease is less likely to be excessively dragged into the spaces between the surfaces of the pockets of a retainer comprising resin retainer members coupled together. Specifically, the aliphatic monoamine preferably accounts for 70 mol % or more of the entire monoamine components.

Diisocyanates which can constitute the above urea compound include, for example, phenylene diisocyanate, tolylene diisocyanate, diphenyl diisocyanate, diphenylmethane diisocyanate, octadecane diisocyanate, decane diisocyanate, and hexane diisocyanate. Aliphatic monoamines which can constitute the urea compound include, for example, hexylamine, octylamine, dodecylamine, hexadecylamine, octadecylamine, stearylamine, or oleylamine. Alicyclic monoamines which can constitute the urea compound include, for example, cyclohexylamine. It is not relatively preferable that the thickening agent comprises an aromatic diurea compound, i.e., a compound containing only an aromatic monoamine (or aromatic monoamines) as a monoamine component (or components).

The base grease is obtained by adding the thickening agent to the base oil. The base grease of the present invention is preferably prepared by reacting the above-described diisocyanate component and monoamine components with each other in the base oil. The content of the thickening agent in the base grease is 1 to 40% by mass, preferably 3 to 25% by mass. If the content of the thickening agent is less than 1% by mass, the thickening effect is insufficient to produce a grease. On the other hand, if the content of the thickening agent is more than 40% by mass, the base grease is too hard to achieve the expected effects.

If an alkanolamine (or alkanolamines) is to be added to the grease, the grease may be prepared by (i) first adding an alkanolamine (or alkanolamines) to the base oil, and then adding the thickening agent to the base oil; or (ii) first preparing a grease not containing an alkanolamine; and then adding an alkanolamine (or alkanolamines) to the grease. Since an alkanolamine includes an amino group, it is preferable to first react the diisocyanate component with the monoamine components in the base oil to prepare the base grease; and then to add an alkanolamine (or alkanolamines) to the base grease.

The worked penetration (JIS K 2220) of the grease is preferably within the range of 220 to 350. If the worked penetration thereof is less than 200, oil separation is insufficient that sufficient lubrication may be impossible. On the other hand, if the worked penetration thereof is more than 350, the grease is so soft that it is likely to flow out of the bearing, which is not preferable.

In the grease used for the ball bearing of the present invention, if the grease contains an alkanolamine (or alkanolamines), the alkanolamine(s) does not exist in the form of a reaction product such as a salt produced by reacting with an acid, but exists in an unreacted form. Therefore, in such a case, the grease should not contain an additive that may form a salt by reacting with the alkanolamine(s), such as a fatty acid. If necessary, a known additive or additives may be added to the above grease, provided that the object of the present invention can be achieved. Examples of such known additives include antioxidants such as organozinc compounds, amine-based compounds, and phenol-based compounds; metal deactivators such as benzotriazole; viscosity index improvers such as polymethacrylate and polystyrene; solid lubricants such as molybdenum disulfide and graphite; rust inhibitors such as metal sulfonates and polyhydric alcohol esters; oily agents such as esters and alcohols; and anti-wear agents not mentioned above.

The grease preferably does not contain an alkali metal salt of an inorganic acid, and an alkaline-earth metal salt of an inorganic acid, for the purpose of, for example, preventing abnormal noise. Such inorganic acids include, for example, phosphoric acid (orthophosphoric acid), hydrochloric acid, nitric acid, sulfuric acid, and boric acid. Alkali metal salts and alkaline-earth metal salts include, for example, lithium, sodium, potassium, calcium, strontium, and barium, specifically, tribasic calcium phosphate (calcium salt of orthophosphoric acid).

The above embodiment is merely an example in every respect, and the present invention is not limited to the above embodiment. The scope of the present invention is indicated not by the above description but by the claims, and should be understood to include all modifications within the scope and the meaning equivalent to the scope of the claims.

Effects of the ball bearing according to the present invention are indicated below by Examples. A ball bearing 51 according to each of Examples 1 to 7 and Comparative Examples 1 to 3 was set on a testing machine illustrated in FIG. 4, which rotates a shaft 53 while applying a load to the shaft 53 by a belt 52, in order to determine whether or not abnormal noise and brittle separation would occur for Examples 1-7 and Comparative Examples 1-2. Tables 1 and 2 show, for each of Examples 1 to 7 and Comparative Examples 1 to 3, the ratio of the radius of curvature $R_i$ of the raceway groove of the inner race with respect to the radius $R_b$ of the balls, and the ratio of the radius of curvature $R_o$ of the raceway groove of the outer race with respect to the radius $R_b$ of the balls. In each of Examples 1 to 7 and Comparative Example 1, a synthetic resin retainer as illustrated in FIGS. 2 and 3 was used, which includes pockets 22 each having concave spherical surfaces 35, cylindrical surfaces 37, and flat surfaces 38. In each of Comparative Examples 2 and 3, a synthetic resin retainer 44 as illustrated in FIG. 5 was used, which includes pockets 47 each having an inner periphery comprising only a spherical surface, and thus not having a cylindrical surface.

Confirmation of Brittle Separation

Greases shown in Tables 1 and 2 were sealed in the respective ball bearings of Examples and Comparative Examples, of which the inner race is rotated by the rotary shaft while being supported by the rotary shaft, and of which the inner and outer races and balls are made of bearing steel SUJ2, and the retainer is made of a synthetic resin). The ball bearings were then subjected to a hard acceleration/deceleration test in order to confirm whether or not brittle peeling/flaking would occur. This test was conducted, with an electric current of 1.0 A flowing in the bearings (6203), under the operation conditions in which the ambient temperature was set at 25 degrees Celsius; the load applied to a pulley attached to the distal end of the rotary shaft was set at 4,000N; and the rotational speed of the bearing was set at 0 rpm to 18,000 rpm. Also, in this test, 1% by mass of iron dust was added to the greases so as to expedite the exposure of fresh surfaces due to wear. After the test, it was confirmed whether or not abnormal peeling/flaking occurred in the bearings. In Tables 1 and 2, the symbol "∘" indicates that no abnormal peeling/flaking was detected, and the symbol "X" indicates that abnormal peeling/flaking was detected.

Confirmation of Abnormal Noise: Noise Test

In the above test, while increasing the rotational speed of each bearing in a step wise manner (in increments of 1000 rpm) from 1000 rpm to 7000 rpm, it was aurally confirmed at each of the seven rotational speeds whether or not noise (abnormal noise) occurred. In Tables 1 and 2, the symbol "∘" indicates that loud noise occurred at none of the seven rotational speeds; the symbol "Δ" indicates that loud noise occurred at one of the seven rotational speeds; and the symbol "X" indicates that loud noise occurred at two or more of the seven rotational speeds.

TABLE 1

|  | Comparative Example 1 | Example 1 | Example 2 | Example 3 | Example 4 | Example 5 | Example 6 | Example 7 |
|---|---|---|---|---|---|---|---|---|
| Ratio of curvature radius of inner race's raceway groove | 1.02 | 1.04 | 1.06 | 1.07 | 1.08 | 1.09 | 1.08 | 1.08 |
| Ratio of curvature radius of outer race's raceway groove | 1.04 | 1.04 | 1.06 | 1.07 | 1.08 | 1.09 | 1.08 | 1.08 |
| Belt load, N | 4.000 | | | | | | | |
| Rotational speed, min−1 | 0~7.000 | | | | | | | |
| Used retainer | Retainer as shown in FIGS. 2, 3 | | | | | | | |
| Grease | Conventional grease for preventing brittle separation | Improved grease for preventing brittle separation | | | | | Urea grease for motor | Lithium grease for motor |
| Abnormal noise | x | Δ | ∘ | ∘ | ∘ | ∘ | Δ | ∘ |
| Brittle separation | ∘ | ∘ | ∘ | ∘ | ∘ | ∘ | x | x |

TABLE 2

|  | Comparative Example 1 | Comparative Example 2 | Comparative Example 3 |
|---|---|---|---|
| Ratio of curvature radius of inner race's raceway groove | 1.02 | 1.02 | 1.08 |
| Ratio of curvature radius of outer race's raceway groove | 1.04 | 1.04 | 1.08 |
| Belt load, N | | 4,000 | |
| Rotational speed, min−1 | | 0~7,000 | |
| Used retainer | Retainer as shown in FIGS. 2, 3 | Retainer shown in FIG. 5 | |
| Grease | | Improved grease for preventing brittle separation | |
| Abnormal noise | X | X | X |
| Brittle separation | ○ | ○ | ○ |

Figure 6A:
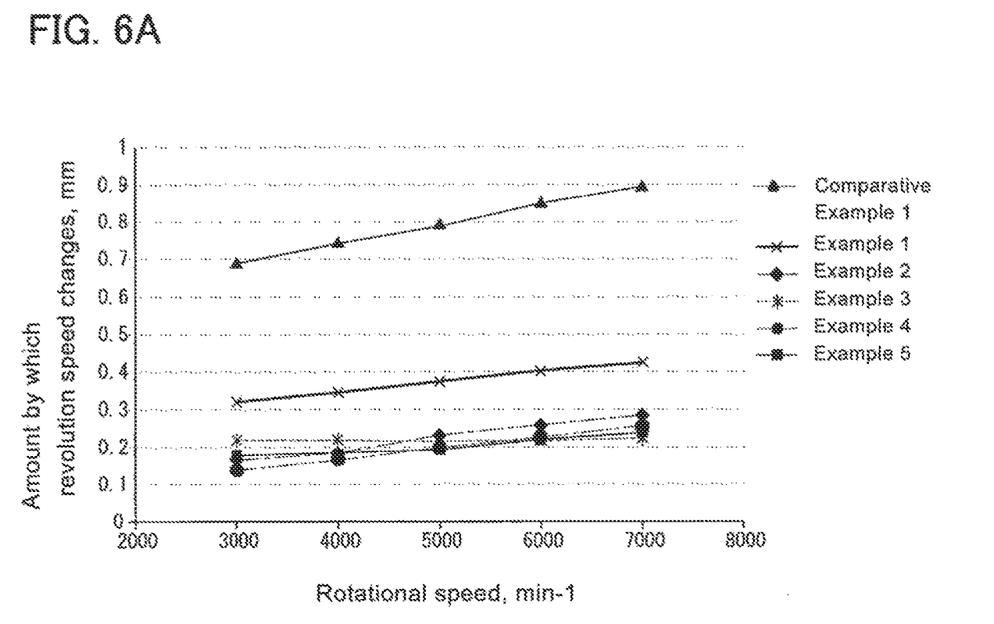
FIG. 6A is a graph showing, in each Example, the amount by which the revolution speed of the balls around the center axis of the bearing changes.

FIG. 6A shows, in each of Comparative Example 1 and Examples 1 to 5, the amount by which the movement/revolution speed of the balls changes when the rotational speed of the bearing is increased from 3000 min$^{-1}$ to 7000 min$^{-1}$. As shown in FIG. 6A, compared to Comparative Example 1, in which the radius of curvature of the raceway groove of the inner race is 1.02, the above moving amount was significantly small in all of Examples 1 to 5.

Figure 4:
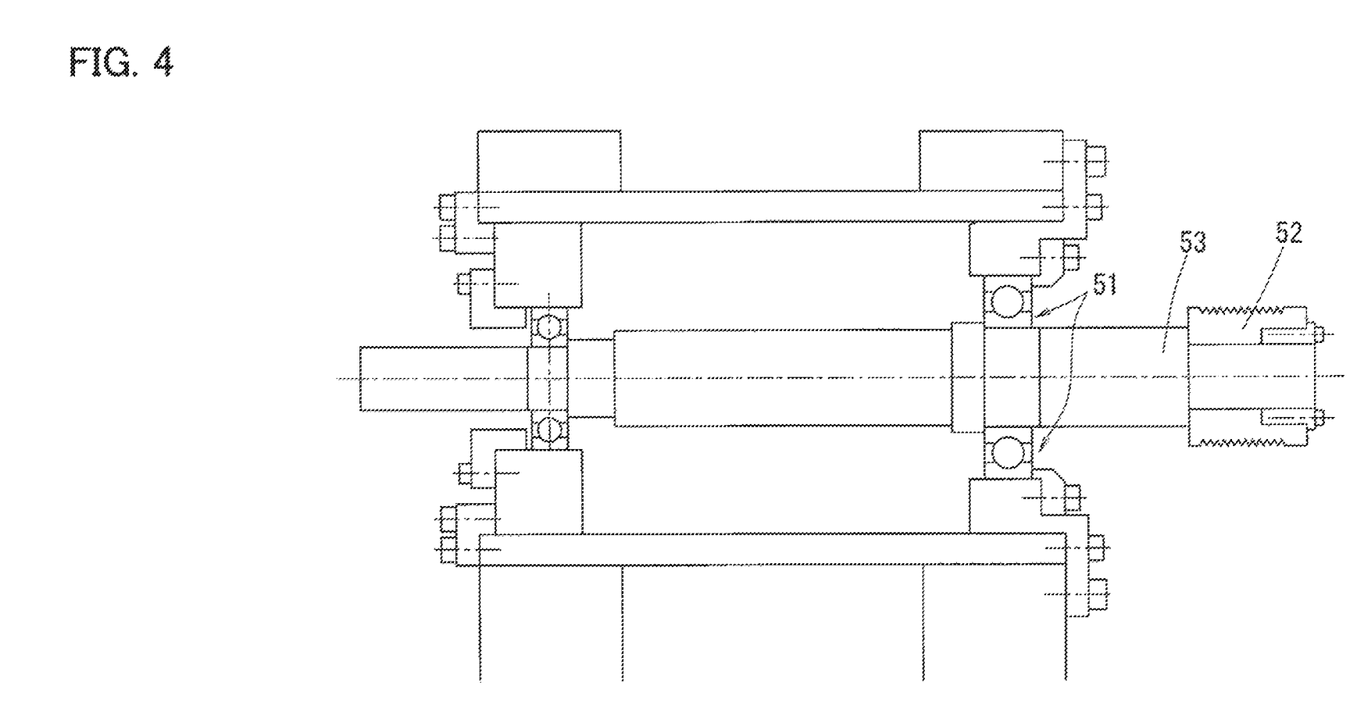
FIG. 4 is a schematic diagram of a testing machine used in Examples.
Figure 5:
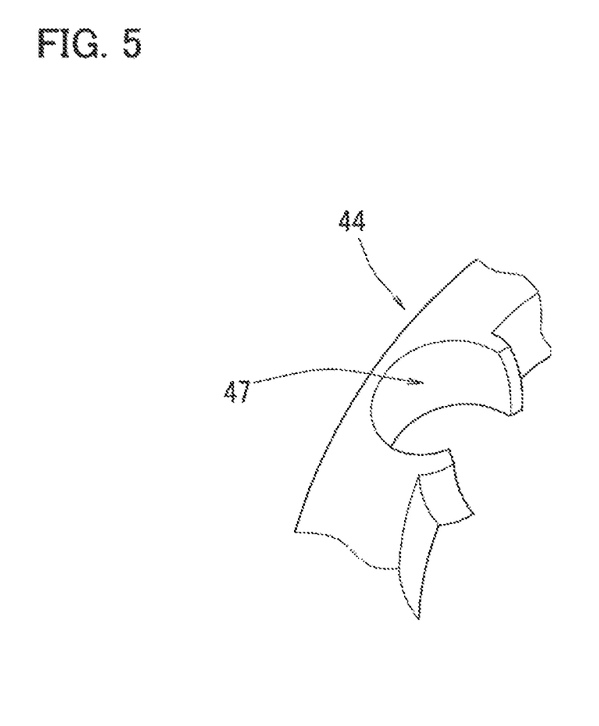
FIG. 5 is an enlarged view of a retainer used in Comparative Examples 2 and 3.
Figure 6B:
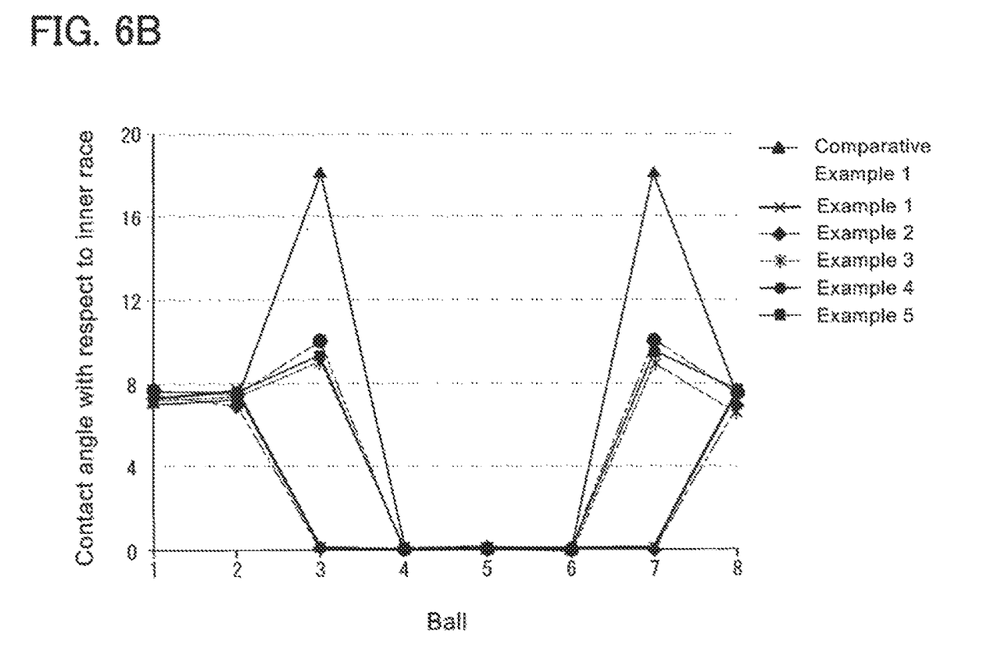
FIG. 6B is a graph showing, in each Example, the contact angle between each ball and the inner race.

FIG. 6B shows, for the ball bearing of each of Comparative Example 1 and Examples 1 to 5, which includes eight balls, the contact angle between each of the eight balls and the inner race when a radial load is applied to the eight balls by the device of FIG. 4. As shown in FIG. 6B, in Comparative Example 1, the above contact angle increased sharply at the boundaries between the load receiving area and the non-load-receiving area of the bearing, whereas such an increase in contact angle was suppressed significantly in all of Examples 1 to 5.

DESCRIPTION OF REFERENCE NUMERALS

1, 10: ball bearing
2, 13: ball
8: retainer
11: inner race
12: outer race
14, 44: synthetic resin retainer
15: seal member
16: annular space
17: raceway groove (of the inner race)
18: raceway groove (of the outer race)
19: seal groove
20: annular member
21: opposed surface
22, 47: pocket
23: pocket wall portion
24: coupling plate portion
25: abutment surface
26: coupled claw
27: coupling hole
28: step
29: hook portion
30: protruding wall portion
31: receiving recess
32: (circumferential) gap
33: (axial) gap
35: concave spherical surface
37: cylindrical surface
38: flat surface
51: ball bearing
52: belt
53: shaft
$R_b$: radius of the ball
$R_i$: radius of curvature of the raceway groove of the inner race
$R_o$: radius of curvature of the raceway groove of the outer race

The invention claimed is:

1. A ball bearing comprising:
   an inner race including a raceway groove in an outer periphery of the inner race;
   an outer race including a raceway groove in an inner periphery of the outer race;
   a plurality of balls disposed between the raceway groove of the inner race and the raceway groove of the outer race;
   a retainer made of a synthetic resin, and constituted by two annular members identical in shape to each other, the retainer retaining the balls, wherein the raceway groove of the inner race has a radius of curvature which is 104% or more and 109% or less of a radius of each of the balls; and
   grease around the balls, the grease comprising:
      a base oil comprising a poly-α-olefin oil having a kinematic viscosity of 30 mm$^2$/s to 70 mm$^2$/s at 40 degrees Celsius;
      a thickening agent comprising a diurea compound obtained by reacting a diisocyanate component with a monoamine component, the monoamine component comprising an aliphatic monoamine and an alicyclic monoamine; and
      an additive selected from the group consisting of alkanolamines and molybdates, a content of the additive being 0.1 parts by mass or more and 10 parts by mass or less with respect to 100 parts by mass of a total amount of the base oil and the thickening agent.

2. The ball bearing according to claim 1, wherein the raceway groove of the outer race also has a radius of curvature which is 104% or more and 109% or less of a radius of each of the balls.

* * * * *